(12) United States Patent
Iacobucci

(10) Patent No.: US 6,779,435 B1
(45) Date of Patent: Aug. 24, 2004

(54) MACHINE FOR AMERICAN STYLE COFFEE FOR USE ON AIRCRAFT

(75) Inventor: Emilio Iacobucci, Frosinone (IT)

(73) Assignee: Iacobucci S.p.A., Ferentino (IT)

( * ) Notice: Subject to any disclaimer, the term of this patent is extended or adjusted under 35 U.S.C. 154(b) by 0 days.

(21) Appl. No.: 09/890,808

(22) PCT Filed: Jan. 28, 2000

(86) PCT No.: PCT/EP00/00669
§ 371 (c)(1),
(2), (4) Date: Nov. 19, 2001

(87) PCT Pub. No.: WO00/45685
PCT Pub. Date: Aug. 10, 2000

(30) Foreign Application Priority Data

Feb. 1, 1999 (IT) ...................................... RM990017 U

(51) Int. Cl.[7] ................................................. A47J 31/00
(52) U.S. Cl. ......................... 99/302 R; 99/295; 99/280; 99/288; 392/449; 392/451
(58) Field of Search ............................... 99/289 R, 295, 99/302 R, 280, 281, 282, 283, 288, 302, 303, 305, 299; 392/449, 451; 219/302, 303, 305, 299

(56) References Cited

U.S. PATENT DOCUMENTS

| | | | | |
|---|---|---|---|---|
| 4,389,925 A | * | 6/1983 | Piana | 99/289 R |
| 4,975,559 A | | 12/1990 | Frisch | 392/449 |
| 5,111,740 A | * | 5/1992 | Klein | 99/295 |
| 5,647,269 A | | 7/1997 | Miller et al. | 99/279 |
| 5,855,161 A | * | 1/1999 | Cortese | 99/295 X |
| 6,345,570 B1 | * | 2/2002 | Santi | 99/289 R |

FOREIGN PATENT DOCUMENTS

| | | |
|---|---|---|
| CA | 2121998 | 10/1995 |
| DE | 298 17 065 U 1 | 9/1998 |
| EP | 0 353 425 | 6/1989 |
| EP | 387 515 | 2/1990 |

* cited by examiner

Primary Examiner—Reginald L. Alexander
(74) Attorney, Agent, or Firm—Abelman, Frayne & Schwab

(57) ABSTRACT

A machine for in aircraft dispenses hot beverages, such as coffee, American-style coffee, and tea, as well as to dispense hot and cold water. The machine includes a hydralic circuit and an electrical circuit, and has a parallelepiped structure including a structural paneling and a paneling forming a covering, an open front compartment in which a container or jug for beverages is housed, and, located above the compartment, a front control panel and underlying cartridge-holder drawer which can be pulled out. The machine includes a heater through which passes water only at the moment of dispensing in the from of a beverage or hot water. The heater is connected to the cartridge-holder drawer and the and the hydraulic actuation system forces the heater to come down onto and close the cartridge-holder drawer in a sealed manner when the beverage or hot water is being dispensed.

39 Claims, 13 Drawing Sheets

MACHINE FOR AMERICAN STYLE COFFEE FOR USE ON AIRCRAFT

SCOPE OF INVENTION

The present invention regards a machine for American-style coffee for use on aircraft. More in general, the machine according to the invention may be used to dispense hot beverages, such as coffee and tea, and/or hot and cold water.

PRIOR ART

For a better definition of the technical field of the present invention, it is necessary to point out that the ancillary equipment used on aircraft, such as coffee machines, must meet specific requirements that correspond to strict aeronautic standards. In particular, machines for making American-style coffee for use on aircraft, which is the technical field to which the present invention refers, must be in compliance with aeronautic standards, such as JAR25, FAR25, RTCA/DO 160C, and RAI (Italian Aeronautics Register) Technical Regulations. It should immediately be said that coffee machines not designed for use on aircraft do not meet any aeronautic standards.

According to JAR25, the machines must, among other things, be able to support up to nine times their own weight; withstand a given range of vibrations (for 1 hour for each Cartesian axis), and still be operative; withstand storage for 3 hours at the temperatures of −55° C. and +85° C.; operate at temperatures of between +1.7° C. and +55° C.; still be operative after being kept for 12 hours in an environment with a relative humidity of ≧95%; and be built with materials which, in the event of fire, are self-extinguishing and with low emission of smoke, so as not to give off toxic gases, and materials such as do not have compositions that are harmful to human health.

In addition, the machines must possess the characteristics according to which if an explosion of a component takes place, the said explosion must be extinguished inside the machine itself; they must also have dimensions such as to enable them to be accommodated and remain fixed in conditions of safety within the special compartments prepared for them on aircraft; and they must also be as light as possible, considering that aeroplanes such as the Boeing 737 or 747 can house even 10 of such machines. The reduction of approximately one kilogram of weight on board an aeroplane can mean considerable energy savings in the course of a a year.

At present, in the aviation field there exist coffee machines, in particular machines for dispensing American-style coffee, tea, or other hot beverages, the design of which is obsolete and which are certainly inadequate for current needs of weight-saving associated to improved functionality and safety. The said machines use a boiler container which remains pressurized for the whole time that the machines are switched on, a period in which the water is heated by means of direct contact with one or more resistors. Airline companies have therefore on numerous occasions expressed the need for innovative coffee machines characterized in particular by reduced weight and maintenance and by improved safety features.

In particular, EP-A387515 discloses a coffee maker for use in aircrafts which does not comprise an hydraulic circuit provided with an actuation system which vertically forces the heater to come down onto the cartridge holder drawer so as to close it in a sealed manner and also said coffee maker is not governed by a software. In addition CA 2121998, EP-A-353425 and U.S. Pat. No. 3,596,588 do not disclose any elements to provide an increased safety and easiness of the control of the brewing process.

There has now been found a specific combination of parts and an adequate choice of components, materials and forms which enable the construction of innovative machines that are able to dispense coffee, the so-called American or American-style coffee, and other hot beverages. The machine configuration and conformation described herein produce a longer-lasting device which is easier to use, safer, and lighter than the machines that are currently known. Further advantages of the invention will be evident from the following description.

In the present description the words "exchanger" and "heater" will be used indifferently, meaning thereby a thermal set comprising heating elements and elements designed for the passage of the fluid that is to be heated.

SUMMARY OF INVENTION

An object of the present invention is a machine that is able to dispense hot beverages, such as coffee, American-style coffee, tea, and/or hot and cold water, in accordance with the attached claims. In particular, the machine comprises a load-bearing structure substantially mad of aluminium, side panels, and bass and head substantially made of aluminium, the said machine being characterized in that it comprises elements configured and conformed in such a way as to be used in the aviation field.

A further object of the invention is a heater with two faces for heating liquids that may be used both in coffee machines of the type used on aircraft and in traditional coffee machines.

Further objects of the present invention will be evident from the ensuing description.

BRIEF DESCRIPTION OF FIGURES

For a better understanding of the invention, a non-limiting example of embodiment of the invention is shown in the attached figures in which.

In the figures, the same reference numbers refer to corresponding functions and/or elements.

DETAILED DESCRIPTION OF INVENTION

Figure 1:
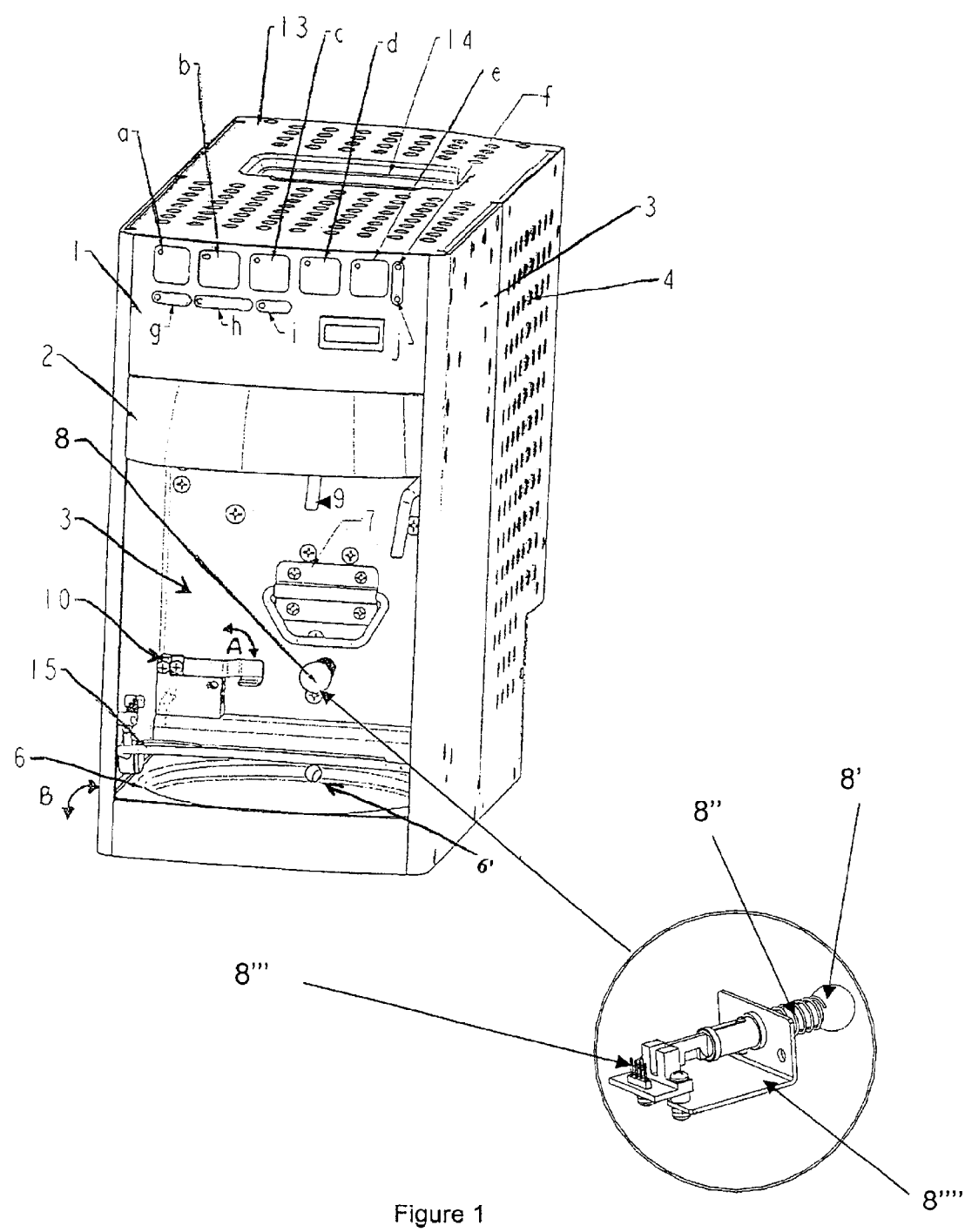
FIG. 1 is a schematic front perspective view of the machine.

The machine according to the invention is designed for preparing hot beverages, such as coffee, American-style coffee and tea in pre-set amounts, as well as for supplying hot and cold water on board the aeroplane. For the preparation of hot beverages, the use of pre-prepared single-dose cartridges is envisaged, for example of the type known for automatic devices in which each cartridge represents a single, possibly pre-compressed, dose of powdered coffee or powdered tea enclosed in filter paper or some other wrapping, through which the hot water and/or steam can pass at pre-set temperatures for the preparation of the beverage. In particular, pre-prepared cartridges containing coffee of standard dimensions (e.g., approximately 108×134 mm) may be used.

The design of the outside of the machine distinguishes it completely from the other machines currently to be found in the aviation field by the rounded shape which is aimed at creating a more comfortable environment for the user. Levers and any other externally protruding systems of operation, which could create situations of danger, are absent. The controls are located on a front control panel of the touch-sensor type, with warning lights and silk-screen printed indicators.

The peculiar characteristic of this machine is represented by the absence of a pressurized boiler for heating the water, instead of which a heater is used inside which water passes only when the beverage is being dispensed, i.e., when the system is open to the atmosphere. In this way, the danger represented by pressurized water enclosed within a container is avoided.

A further characteristic of the machine is that of having the heater correspondingly connected to the cartridge-holder system, the heater and the cartridge-holder being operatively combined together vertically. This mode of operation is obtained by means of a hydraulic system. Consequently, no lever-type mechanical system is present on the machine for closing the cartridge-holder compartment. This operation is performed by the pressure supplied by a pump on a hydraulic piston that is operatively connected to the heater. In this way, the heater comes down onto the cartridge-holder compartment, substantially sealing it and preventing any steam from coming out. The cartridge-holder compartment is provided, above the cartridge itself, with a perforated plate. Between the said plate and the bottom surface of the heater a chamber is created which enables uniform distribution of the water over the cartridge. The heater is made of aluminium and heats the water without increasing its pressure since no pockets of hot air are present along the entire path of the water. The heater is of the two-faced type with plane configuration, wherein a heating element is set between two areas, one above and one below the element, in which the water to be heated passes. With such an arrangement, the thermal yield is maximized and leakage of heat is minimized. The heater/cartridge-holder coupling system may also be associated to traditional machines.

The machine components are chosen in such a way as to be in compliance with the aforementioned aeronautic standards and to guarantee a mean time between failures (MTBF) of 5000 hours (assuming the routine maintenance programme).

The machine may be built in such a way as to have preferably the following technical specifications; depth 310–390 mm; width 150–180 mm; height 290–340 mm; weight 11–16.7 kg; power supply 115 V, 400 Hz three-phase, or 28 Vdc; power up to 3500 W; pressure of incoming water 0.3–5.0 bar, preferably 1.5–2.0 bar.

The electrical and hydraulic interfaces are compatible with aeroplane galleys; i.e., the incoming and outgoing water connectors and the electrical connector are selected, arranged and positioned appropriately on the rear of the machine. Preferred electrical connectors are of the type MS3106A-16S-1P (ITT-Canon); preferred water connectors are of the type Hansen 2KLF16 (Hansen), or products having similar features.

The material used is mainly anodized aluminium machined using numerical-control machines to guarantee an adequate resistance combined with lightness and the precision of the pieces made. Such types of machining are well known to persons skilled in the art and enable pieces to be obtained that are machined with precision and very low tolerances. The use of plastic is limited to the minimum. All the materials are in compliance with the Handbook of Sanitation for Airlines (USPHS). The pipes for delivering water are made of Teflon® for foodstuffs, and the pipe fittings are made of non-harmful material.

The printed-circuit boards are surface-treated with a protective treatment so as to withstand vibrations, be resistant to humidity, and be resistant to fungi and bacteria or other organic contaminants.

The machine is equipped with a hydraulic section for water delivery and with a system of pumps for maintaining the flow of water constant inside the machine irrespective of the environmental operating pressure present in the aircraft.

The hydraulic circuit is designed so that the failure of any active element making it up (valves, pumps, etc.) will not create overpressures in the circuit. The movement of water inside the hydraulic system of the machine is ensured by pumps and controlled by solenoid valves. Measurement of the incoming-water pressure is made by means of a solid-state pressure sensor and is used as regulating input by a software with which the machine is equipped. When the pressure is not within the range set for machine operation, a warning light lights up on the front panel of the machine.

A filter 18' of a commercially available type, for example an ion-fractionation filter, is located at the point of water intake to prevent deposition of lime. In order to reduce weight, the aforesaid commercially available filter may be advantageously rendered lighter by replacing the outer casing with a corresponding aluminum casing.

In order to prevent overpressure, a suitably calibrated air valve is positioned downstream of the pumps.

One hydraulic distributor for cold water and one for hot water make up the communication between the solenoid valves for distributing the incoming and outgoing fluid. The said distributors are basically parallelepipedal elements made of plastic material, such as ERTA PVDF (polyvinylidene fluoride) manufactured by Angst Pfizer or a product having similar performance features, and inside them channels are made for the passage of water, these channels being arranged in such a way as to create the appropriate connection between the solenoid valves, thus avoiding the use of cumbersome pipe fittings.

The solenoid valves used for the distributors are of the header type. They present the advantage of eliminating part of the pipe connections in that the header, which is provided with an inlet hole and an outlet hole for the fluid, is connected directly to the hydraulic distributor. The said valves are easy to disassemble.

The solenoid valves are of two types: two-way and three-way. The two-way solenoid valves control the flow of water by opening and closing. The three-way solenoid valves, which work in the same way as the two-way ones, in addition present a way for discharging the water.

The solenoid valves that govern the hot water stretch are chosen to withstand temperatures of up to at least 150° C. and have ruby gaskets. The other gaskets of the machine are made of Viton®.

The pipe fittings on the hot water parts are made of stainless steel so as to present high efficiency both from the point of view of thermal characteristics and from the point of view of alimentary characteristics (instead, the pipe fittings on machines not designed for use on aircraft are made of nickel-plated brass, which may be subject to flaking at high temperatures).

The electrical circuit is designed and built so as not to create any electromagnetic interference with the instrumentation on board the aircraft and, at the same time, so as not to be affected by the said instrumentation. For this reason, the cards of all the electrical supplies are filtered using, for example, EMI filters or filters 19' presenting similar features, which are designed basically to eliminate the high-frequency components which could generate electromagnetic waves.

The machine is electrically protected against overtemperatures by manually resettable safety thermostats mounted directly on the heater (e.g., ones manufactured by the firm Termix), and inside the hydraulic circuit also in the case of failure of the control solenoid valves there is no possibility of the exchangers remaining pressurized since they are equipped with three-way solenoid valves which, when they are de-energized, are open towards the discharge.

The machine is designed so that water will not collect and consequently stagnate:

the water that is not used is all sent to be discharged. In this way, the formation of harmful micro-organisms (algae, fungi, bacteria, etc.) is prevented.

The machine does not have any external handles, and consequently is safer than machines currently available on the market in that it does not have any parts to get hooked on to accidentally.

The machine and all the elements that can be removed from it, such as the drawer and the jug, are protected against the possibility of accidental release, in that they are located in seats provided with self-locking devices which, when the items are inserted, must first be released; i.e., locking of the items in place is automatic when the items are inserted in their respective seats.

The machine is also equipped with a weight-sensitive safety system inserted on the jug resting surface; i.e., the plate which carries the jug for the beverages is hinged on the bottom of the machine and rests on the front of the machine on a force sensor so that, when the jug is positioned, for example partially filled, the possibility of a further non-controlled addition of water causing it to overflow is prevented; that is, the load cell governs water delivery.

The machine is protected from electrical overloads by a main supply switch, referred to as circuit breaker, located on the rear of the machine. As a result, the machine does not have any fuses which would have to be set one on each phase and which would entail, when they blow, disassembly, replacement and reassembly. In the event of the current on one of the three phases exceeding a pre-set threshold value, for example 10 A, in the machine according to the invention the current on all the phases is automatically cut off. Once the overload has been eliminated, the circuit breaker (e.g., Klixon—Texas Instruments) can be reset manually, just like an ordinary switch.

The main functions of the machine are governed by an electronic section managed by a microprocessor (CPU 16') based upon an original software. The presence of a serial port 16" is moreover envisaged, via which, by means of connection to a simple personal computer, it is possible to read the history file of the machine, for example, the number of operating cycles and/or the hours of operation, and/or other indications useful for routine maintenance of the machine. Through the said serial port, it is also possible to supply information to the machine and vary the machine parameters, such as amount of water for the coffee function (if, for example, the capacity of the jug varies), weight of jug, and temperature of water delivery. The corresponding software is supplied to the customer, who can make modifications to it as he wishes.

The invention will now be illustrated with reference to the attached figures, which are to be considered a non-limiting illustration of the invention.

DESCRIPTION OF A PREFERRED EMBODIMENT OF THE INVENTION

Figure 2:
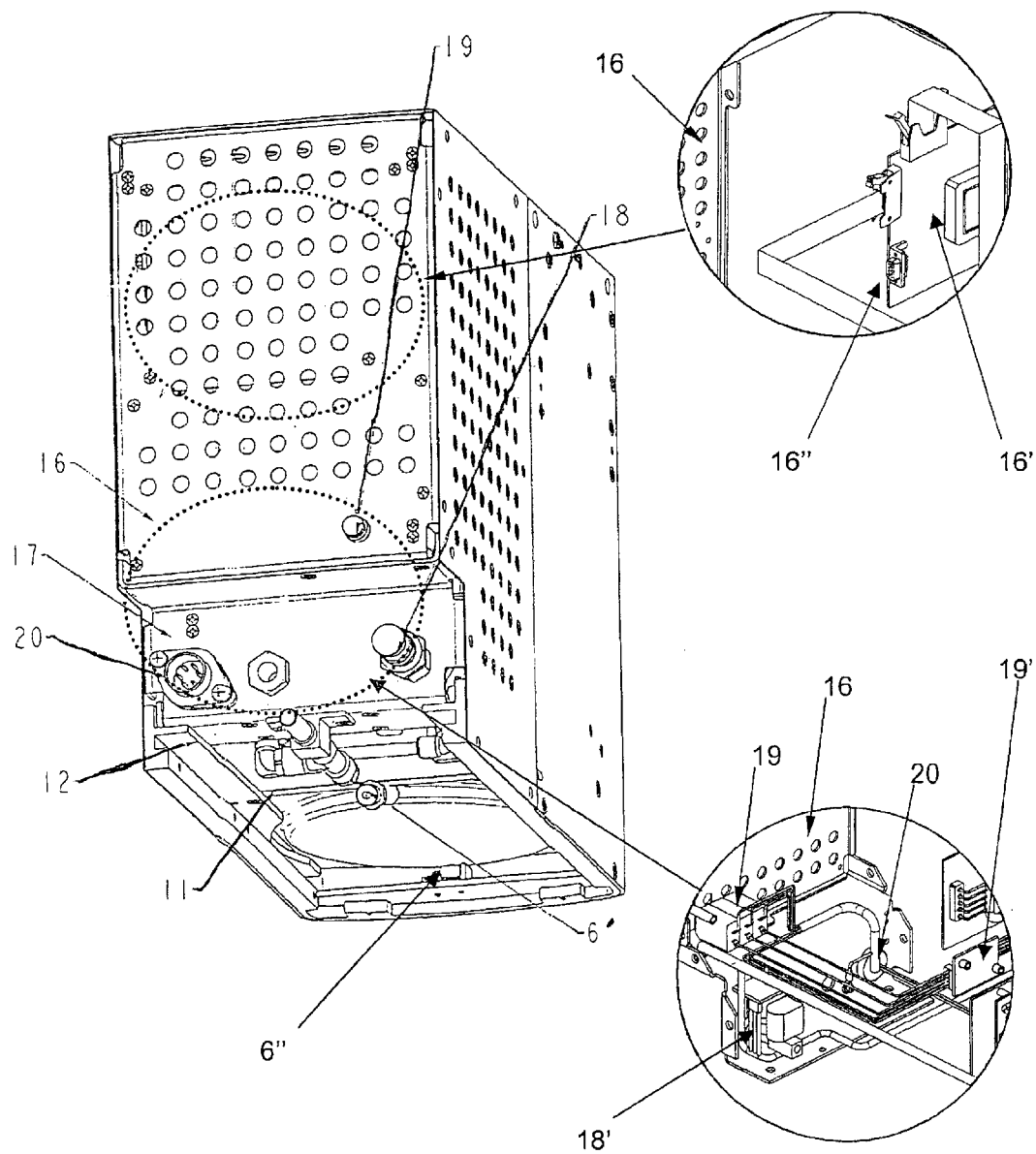
FIG. 2 is a schematic rear perspective view of the machine.

With particular reference to FIGS. 1 and 2, the machine according to the invention has a basically parallelepipedal shape and is built of aluminum, preferably the alloy 6082T6 produced by the firm Alcoa or the firm Metra, or some other product having similar features in terms of lightness and resistance. The outer structure of the machine comprises a front control panel I of the touch-sensor type (known to persons skilled in the art), with the controls of the various functions silk-screen printed on it, for example as follows: a) ON/OFF switch; b) "coffee" switch; c) "tea" switch; d) "hot water" switch; e) "cold water" switch; f) "blocked" indicator; g) "ready" indicator; h) "no water" indicator; i) "failure" indicator; and j) "released" indicator. Beneath the front panel 1, the pull-out drawer 2 is present, inside which the cartridge (not shown) is inserted. The drawer 2 opens and closes in a sliding way and to ensure safety it has one locking position whereby, once the drawer has been completely inserted into the machine, it may subsequently be pulled out during normal machine operation (for inserting or removing the cartridge). The drawer 2 is appropriately sized to house the cartridge and has on the bottom a hole through which the hot beverage passes to be subsequently collected in the jug. The reference numbers 3, 3' indicate the structural or load-bearing panel of the machine, which is substantially U-shaped, built in such a way, above all in terms of thickness, as to bear the weight of the machine. The two perforated rear side panels are indicated by 4 and have the sole function of covering. On the front of the machine an open compartment is made, in which the container or jug (not shown) for the beverages is housed. The said open compartment is delimited basically by the bottom wall of the drawer 2, by the structural panel 3, 3', and by the surface or plate 6 for supporting the jug. On the bottom of the wall 3', the following are located: a handle 7 for pulling out the machine, a spring-type sensor 8 (comprising a rod 8'. a spring 8". a bracket 8'''. an optical sensor 8""), which detects the presence of the jug when this is inserted and pressed against the said sensor 8, and the spout 9 for delivering the hot or cold water to the jug. On the wall 3', at the bottom, there is also set a handle 10 which may be raised and lowered, as indicated by the double-headed arrow A, so as to correspondingly raise or lower a pin (not shown) which slides in the guide 11 and has the function of blocking the machine on the aircraft galley. The housing of the machine on the galley is made in such a way that it slides on rails, the guides of which are indicated by 12 and are made of a substantially channel-shaped extruded aluminum section.

At the top, the machine has a covering panel 13 which has a compartment 14 in which a handle (not shown) for lifting and transporting the machine is housed. As regards the plate 6, this is shaped so as to conveniently accommodate the bottom of the jug (not shown). The plate 6 is slightly inclined towards the rear of the machine and has a drainage hole 6' connected to the discharge, so that any liquid that may accidentally be spilled is carried towards the discharge. In addition, a device is provided for safety fixing of the jug, basically consisting of a shaped rod 15 which is operated by a spring (not shown) and which moves as indicated by the double-headed arrow B. The said rod 15 must be manually lowered for insertion of the jug, which, once it is housed on the plate 6, is held in position by the rod 15 coming back up; the rod 15, at the same time, holds the jug in position also with respect to the presence sensor 8.

The plate 6 is in turn hinged on the bottom wall 3'. The plate 6 rests on a load-cell system 6" which is able to detect the presence and weight of the jug and correspondingly control filling thereof.

At the rear the machine has a first perforated rear panel 16 for covering and a second rear panel 17 for support, on which the connector for water 18 and the electrical connector 20 are present. The reference number 19 indicates the manually resettable circuit breaker, which, in this embodiment, is positioned on the supporting panel 16.

Figure 3:
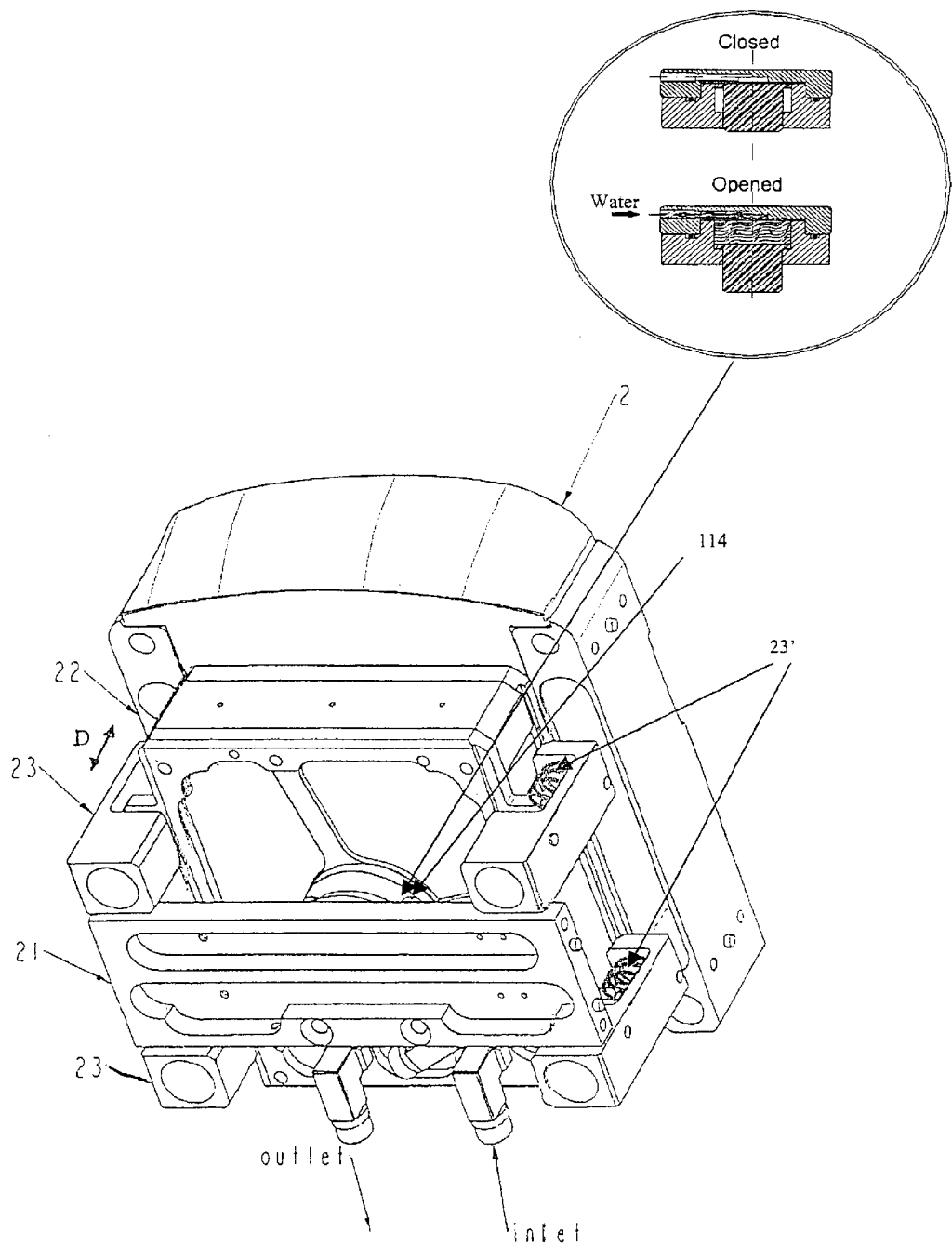
FIG. 3 is a schematic perspective view of the heater/cartridge-holder drawer assembly.

FIG. 3 is a schematic perspective view of the cartridge-holder drawer 2/exchanger 22 assembly. The exchanger 22, which is otherwise referred to herein as heater, is illustrated in greater detail in FIGS. 4 and 5. Located on the exchanger 22 are the water inlet and water outlet. In addition, the exchanger 22 can move in the direction indicated by the double-headed arrow D along the travel guides 23, assisted by the presence of springs 23'. This movement is produced by a hydraulic piston (114) the striking plate of which is indicated by 21, the said piston being pressurized by a pump (not shown) within the first two seconds of the coffee cycle, after which time it is kept pressurized by the closing of the separation solenoid valve 113. At the end of the cycle, the pressure is discharged through the opening of the solenoid valve 113 and the solenoid valve 112 (the said solenoid valves not being shown in FIG. 3—see FIG. 10), and the residual water is discharged.

Figure 4:
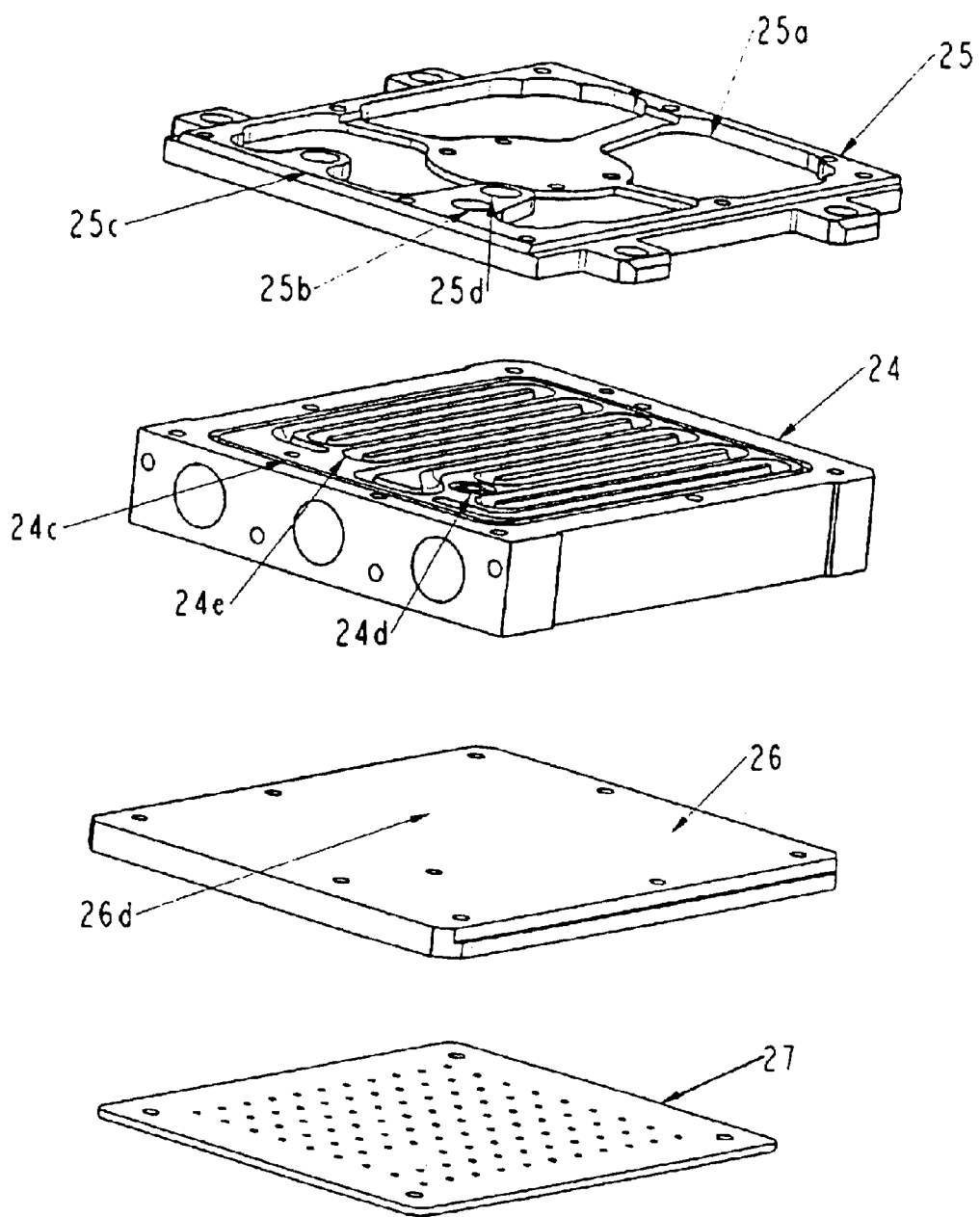
FIG. 4 is an exploded schematic view of the heater from above.
Figure 5:
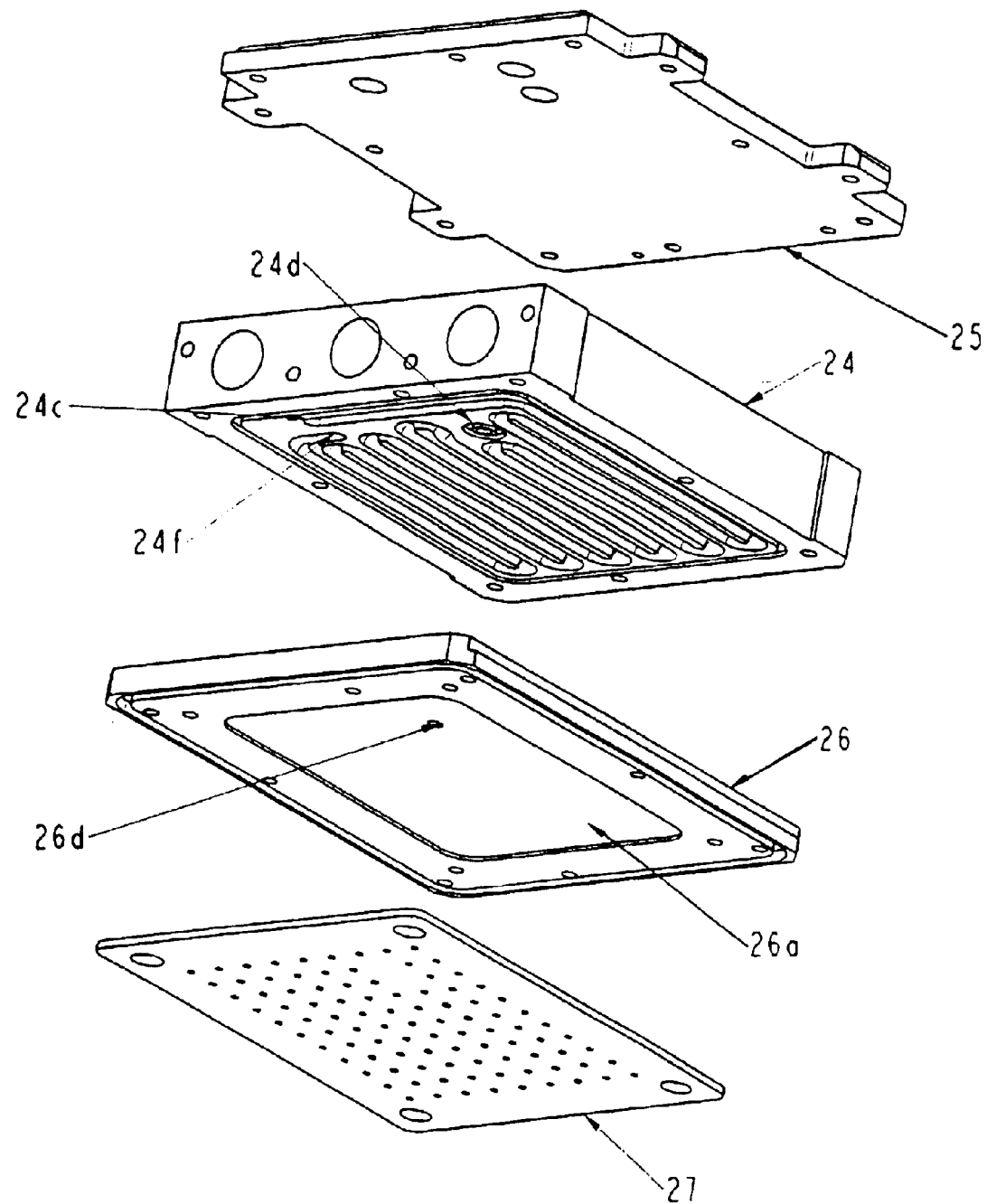
FIG. 5 is an exploded schematic view of the heater from below.

With reference to FIGS. 4 and 5, the parts making up the exchanger 22, which is made of machined anodized aluminium, are illustrated. In the embodiment, the exchanger 22 has a plane conformation and comprises four elements.

The first of these is a central element 24, inside which at least one resistor is embedded (in the example shown there are three resistors 24a, 24b, 24c, which may be cylindrical resistors of the type IRCA-Zoppas, 115 Vdc, 800–1000 W). The top and bottom surfaces of the element 24 are furrowed by grooves (hereinafter referred to as coils) 24e and 24f having a semicircular cross section. The two coils may be different from one another, and each of them is sized, in terms of length and section, according to the amount of water that is to be heated, this amount in turn varying according to the function chosen (coffee, tea, hot water). Advantageously, one coil may be approximately 1.5 metres long. According to a preferred arrangement, the machine is equipped with two heaters, one for the beverage and hot-water functions, and the other for the steam function. The exchanger 22 is provided with plastic gaskets and coatings such as to reduce loss of heat to a minimum and to maximize efficiency. The element 24 also has a hole 24d which sets the two coils 24e and 24f in communication with one another. The central element 24 is closed in a sealed manner between a further two plane elements, the overlying element 25 and the underlying element 26. The element 25 is in turn provided, on its top face, with recesses or hollows 25a made for lightening the structure, the purpose of which is basically to reduce weight and to economize on material. The element 25 is further provided with a hole 25b for intake of water into the exchanger 22, with a corresponding water-outlet hole 25c, and with a further hole 25d for passage of water to the drawer 2. The latter hole 25d corresponds to a further two holes, 24d and 26d, which are also directed towards the drawer 2. The underlying element 26 is in turn provided with the aforesaid hole 26d and, on its bottom face, with a recess or chamber 26a, whilst its top face is basically plane. Underneath the element 26 is mounted the perforated plate 27, which faces and/or is in contact with the cartridge (not shown) housed in the drawer 2. The function of the recess 26a, which may have a thickness of approximately 0.8 mm, is that of distributing the water evenly in the recess 26a itself and of making it come out, assisted by the series of holes present on the plate 27, so as to wet the cartridge rapidly and evenly.

In the exchanger 22/drawer 2 assembly, the water passes as follows: the water comes into the hole 25b, passes into the coil 24e, drops into the hole 24c, runs along the coil 24f, returns upwards through the hole 24c, and comes out of the exchanger through the hole 25c. It then goes to the solenoid valve 106, returns to the hole 25d, passes through the holes 25d, 24d and 26d, and then arrives at the chamber 26a, from where it is distributed, comes out from the holes in the plate 27, and drops through the cartridge in the drawer 2, from which it comes out through an outlet hole (not shown) located above the jug.

FIGS. 6a to 9 present, the flow charts of the "coffee" (FIGS. 6a, 6b, 6c), "tea" (FIGS. 7a, 7b), "hot water" (FIG. 8), and "cold water" (FIG. 9) functions (also referred to as cycles) that the machine is able to perform. These flow charts are self-explanatory, and a person skilled in the art is able, when reading them, to understand all the safety functions with which the machine is provided.

Figure 6A:
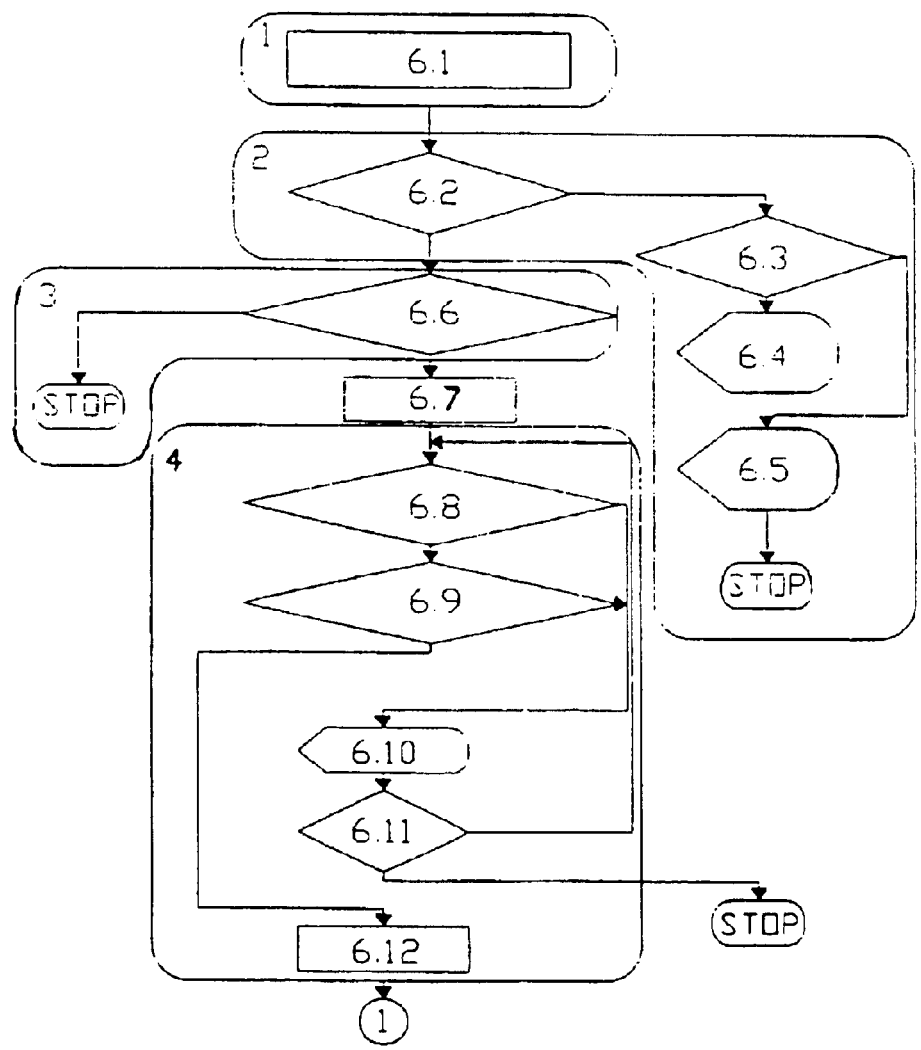
FIG. 6a is a first part of the flow chart of the American/coffee function.
Figure 6B:
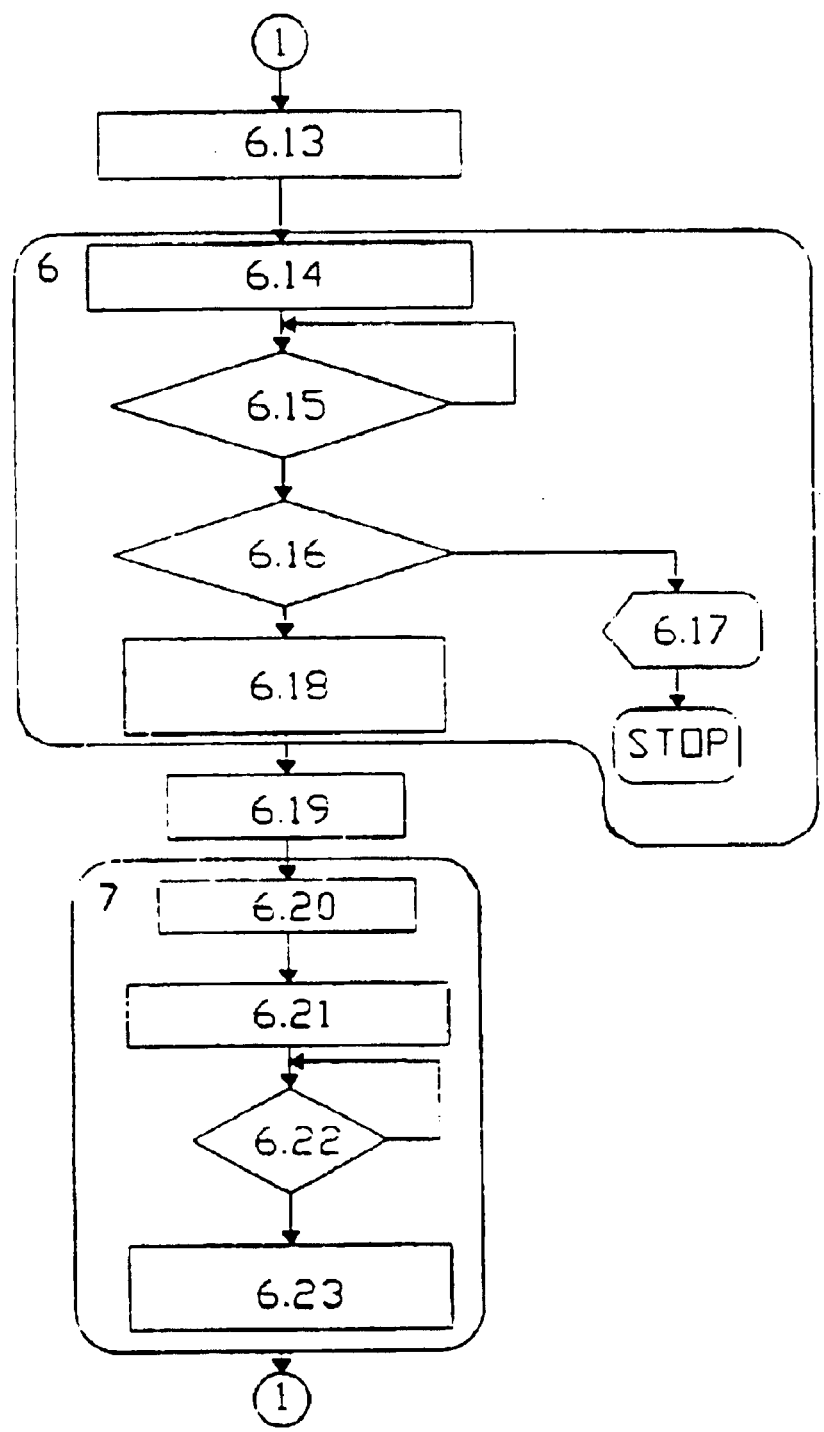
FIG. 6b is a second part of the flow chart of the American-coffee function.
Figure 6C:
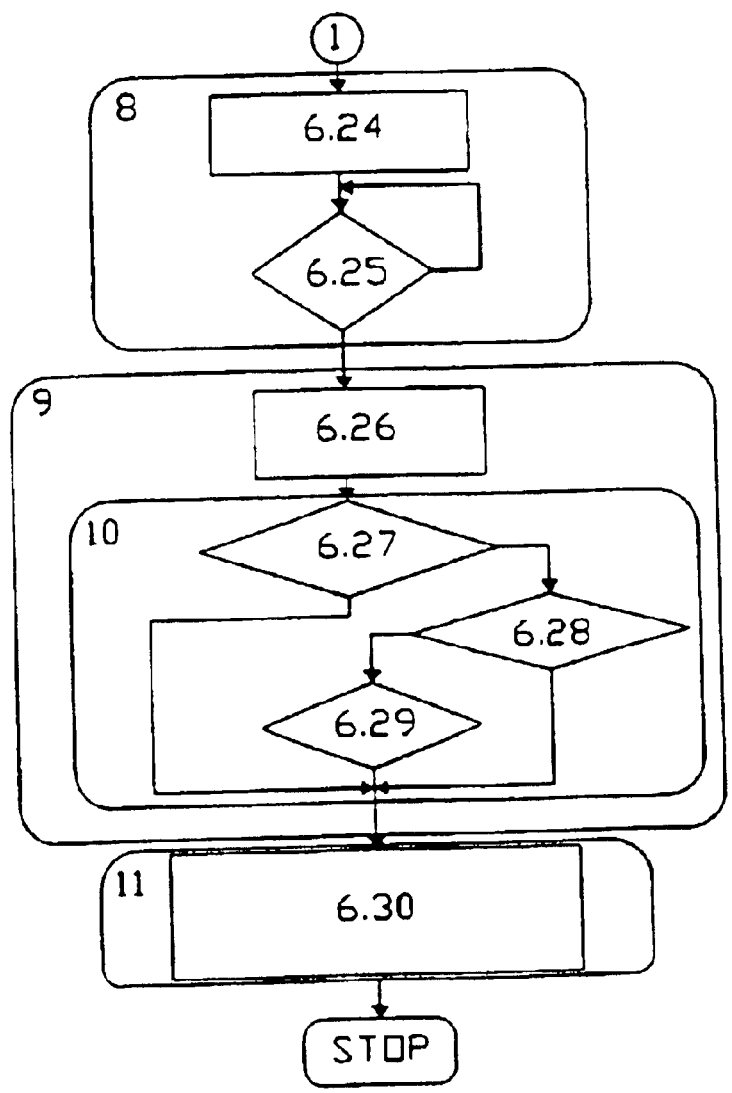
FIG. 6c is a third part of the flow chart of the American-coffee function.

With particular reference to FIGS. 6a, 6b, 6c, they refer to the same "coffee cycle" with the following operation steps:
6.1 press "coffee" switch
6.2 is the "water in line" condition present?
6.3 is the "low pressure in line" condition present?
6.4 is the "no water" led permanently on?
6.5 "no water" led flashing|stop
6.6 is the "temperature ready" condition present?
6.7 start-up of "10-sec timer"
6.8 is the condition "server ok" present?
6.9 is the condition "cartridge-holder in position" present?
6.10 "coffee" led flashing
6.11 does the "10-sec timer" stop?|stop
6.12 stop of "10-sec timer"
6.13 start-up of "4-min timer"
6.14 start-up of "2-sec timer"
6.15 does the "2-sec timer" stop?
6.16 is the condition "cartridge-holder in position" present?
6.17 "failure" led lights up|stop
6.18 does solenoid valve 113 deactivate?
6.19 flow meter 103 starts count
6.20 start-up of "10-sec timer"
6.21 activates solenoid valves 104 and 106
6.22 does the "10-sec timer" stop?
6.23 stops pump and deactivates solenoid valves 104 and 106
6.24 start-up of "10-sec timer"
6.25 does the "10-sec timer" stop?

6.26 starts up pump and activates solenoid valves 104 and 106
6.27 does the flow meter stop count?
6.28 is the condition "server active" present?
6.29 does the "4-min timer" stops?
6.30 stops pump and counters and deactivates solenoid valves 106 and 112—increases by one the "coffee cycles" counter|stop The characteristics of the "coffee" function are: 1.5|±10% of coffee at a temperature of approximately 85° C.±5° C. in approximately 2 min 45 sec±15 sec for a pressure line at 1.2–3.0 bar.

Controls and safety devices are provided, as described in what follows. The "coffee" function is operative only if the following conditions are satisfied:

a pressure sensor reads a line pressure of 0.3–5.0 bar;

a temperature probe in the exchanger 22 reads a value of approximately 98° C. when the function is requested;

an optical sensor is ON (i.e., the jug is present);

a first microswitch is ON (the drawer is completely inserted); and a second microswitch is ON two seconds after the request for coffee (this means that a hydraulic piston is pressing against the exchanger 22 and the drawer 2).

During delivery, if one of the aforesaid conditions is no longer satisfied (with the exception of the condition regarding the temperature probe), the function is interrupted immediately. End-of-delivery is controlled by a flow meter. A second safety system is present, which is controlled by the force sensor located underneath the surface or plate 6 on which the jug rests and which interrupts delivery by checking the weight of the jug that is being filled. In addition, a 4-minute timer interrupts delivery if none of the above-mentioned devices is working.

The "coffee" function is also interrupted when the "coffee" switch on the front control panel is pressed again.

Figure 7A:
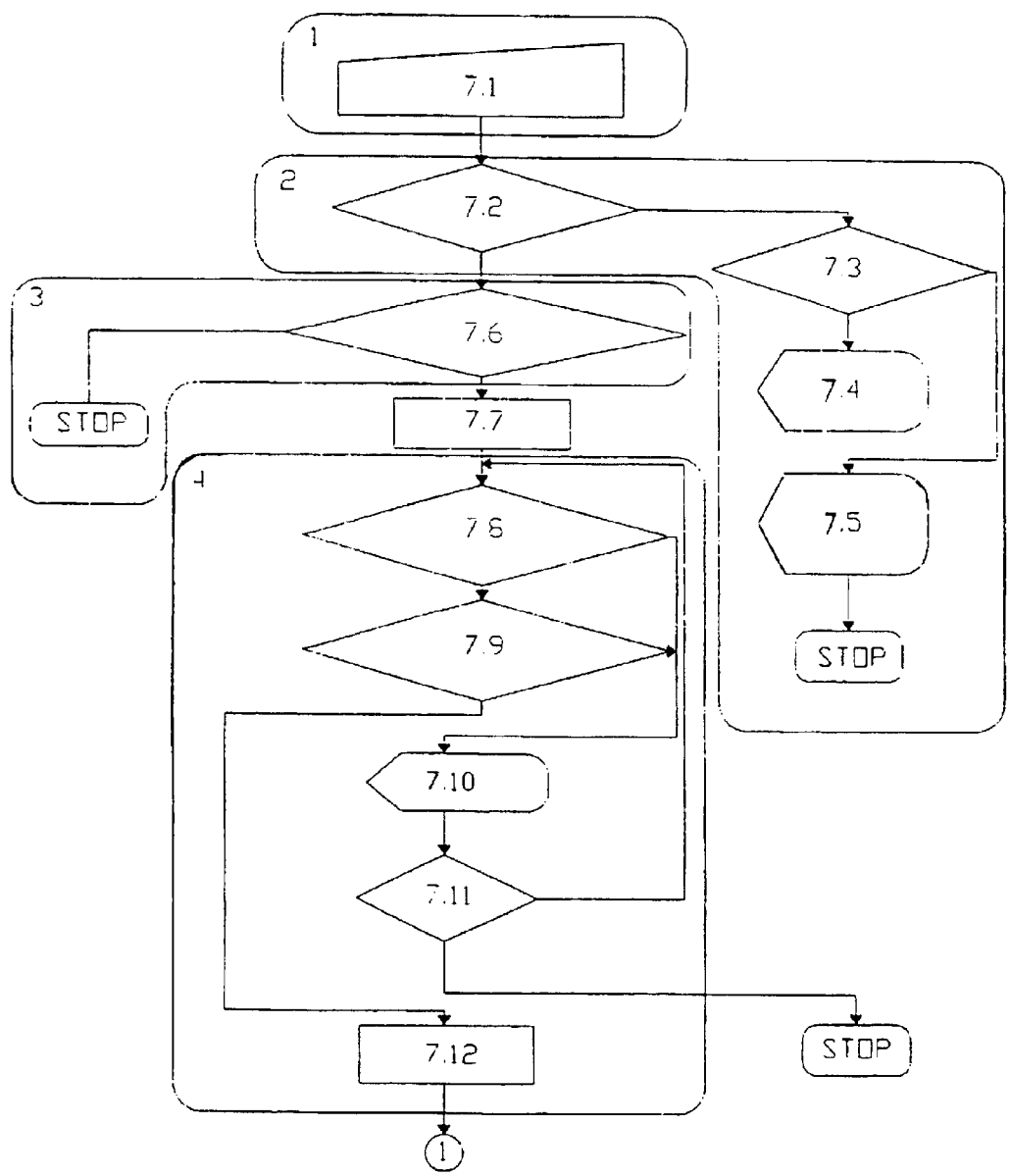
FIG. 7a is a first part of the flow chart of the tea function.
Figure 7B:
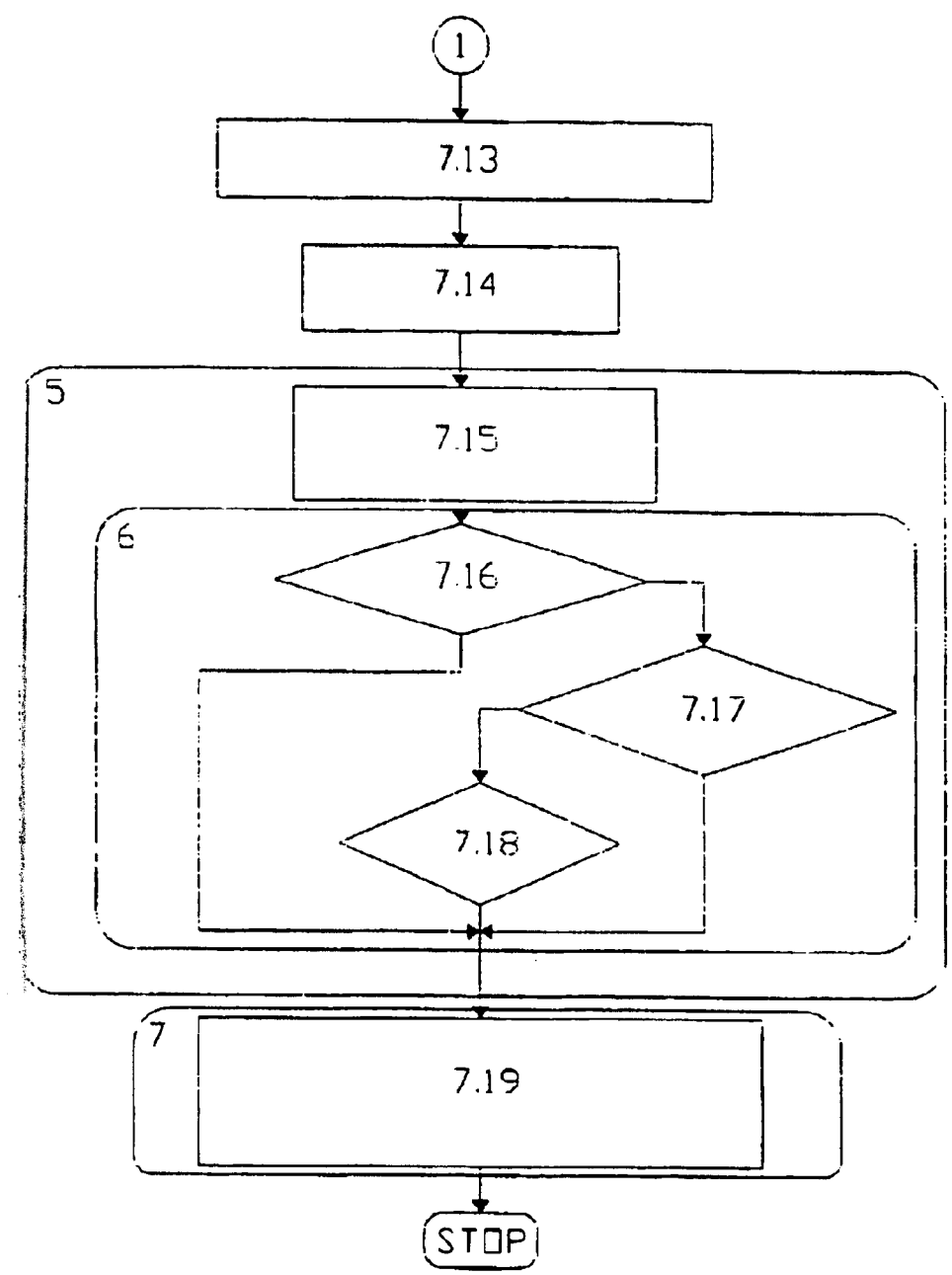
FIG. 7b is a second part of the flow chart of the tea function.

Both FIGS. 7a and 7b refer to the "tea" function, the characteristics, controls and safety devices of which are similar to those of the "coffee" function.

Figure 8:
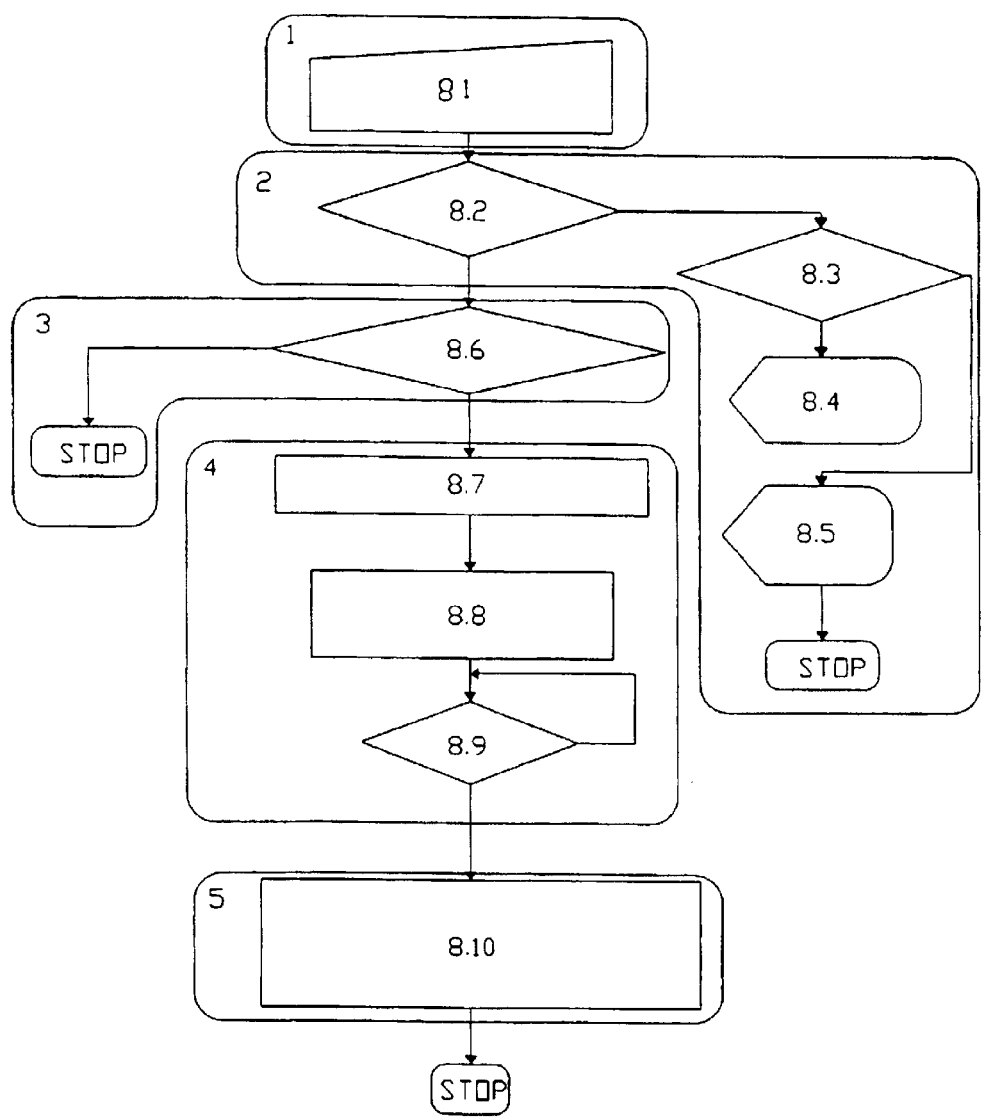
FIG. 8 is the flow chart of the hot-water function.

Herein below there are described the operation steps:
7.1 press "tea" switch
7.2 is the "water in line" condition present?
7.3 is the "low pressure in line" condition present?
7.4 is the "no water" led permanently on?
7.5 is the "no water" led flashing?|stop
7.6 is the "temperature ready" condition present?|stop
7.7 start-up of "10-sec timer"
7.8 is the condition "server ok" present?
7.9 is the condition "cartridge-holder in position" present?
7.10 "tea" led flashing
7.11 does the "10-sec timer" stop?|stop
7.12 stop of "10-sec timer"
7.13 start-up of "4-min timer"
7.14 flow meter 103 starts count
7.15 starts up pump and activates solenoid valves 104 and 107
7.16 does flow meter finish count?
7.17 is the "server active" condition present?
7.18 does the "4-min" counter stop?
7.19 stops pumps and counters and deactivates solenoid valves 104 and 107—increases by one the "tea cycles" counter |stop FIG. 8 refers to the "hot water" function. Herein below there are described the operation steps:
8.1 press "hot water" switch
8.2 is the "water in line" condition present?
8.3 is the "low pressure in line" condition present?
8.4 is the "no water" led permanently on?
8.5 "no water led flashing |stop
8.6 is the "temperature ready" condition present?|stop
8.7 start-up of "20-sec timer"
8.8 starts up pumps and activates solenoid valves 104 and 108
8.9 "20-sec" timer stops
8.10 stops pumps and deactivates solenoid valves 104 and 108 —increases by one the "hot water cycles" counter |stop The characteristics of the "hot water" function are: approximately 0.25 l of hot water at a temperature of approximately 85° C.±5° C. in approximately 30 sec.

Controls and safety devices are provided, as described in what follows. The "hot water" function is operative only if the following conditions are satisfied:

a pressure sensor reads a line pressure of 0.3–5.0 bar;

a temperature probe in the exchanger 22 reads a value of approximately 98° C. when the function is requested;

During delivery, if the first condition is no longer satisfied, the function is immediately interrupted. Delivery is interrupted after 30 sec. or else by pressing the "hot water" switch on the front control panel again.

Figure 9:
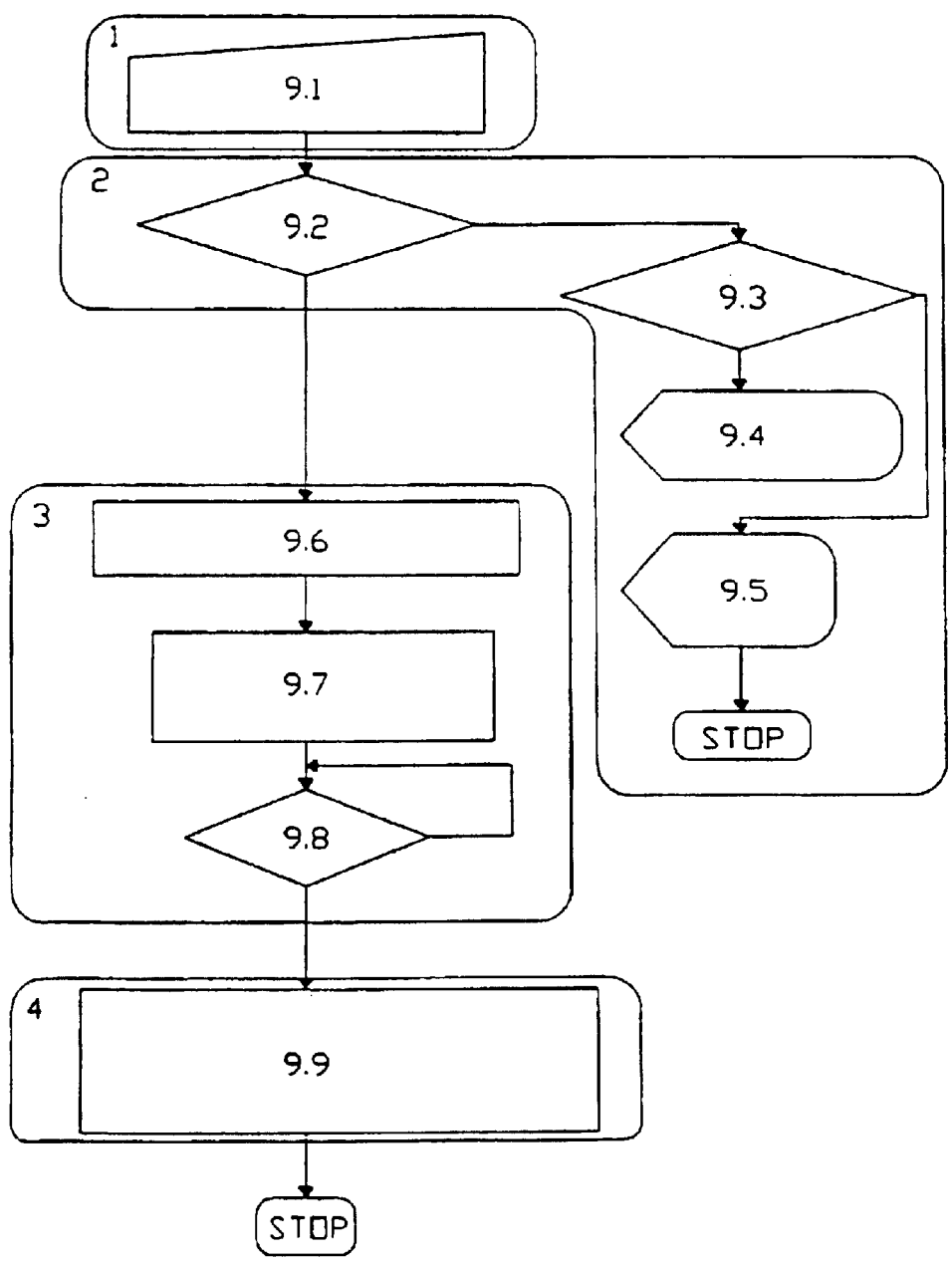
FIG. 9 is the flow chart of the cold-water function.

FIG. 9 refers to the "cold water" function. Herein below there are described the operation steps:
9.1 press "cold water" switch
9.2 is the "water in line" condition present?
9.3 is the "low pressure in line" condition present?
9.4 is the "no water" led permanently on?
9.5 "no water" led flashing|stop
9.6 start-up of "20-sec timer"
9.7 starts up pump and activates solenoid valve 111
9.8 "20-sec" timer stops
9.9 stops pump and deactivates solenoid valve 111—increases by one the "cold water cycles" counter|stop The characteristics of the "cold water" function are: approximately 0.25 l of cold water at room temperature.

Controls and safety devices are provided, as described in what follows. The "cold water" function is operative only if the pressure sensor reads a line pressure of 0.3–5.0 bar. Delivery is interrupted after 30 sec, or else by pressing the "cold water" switch on the front control panel again.

Figure 10:
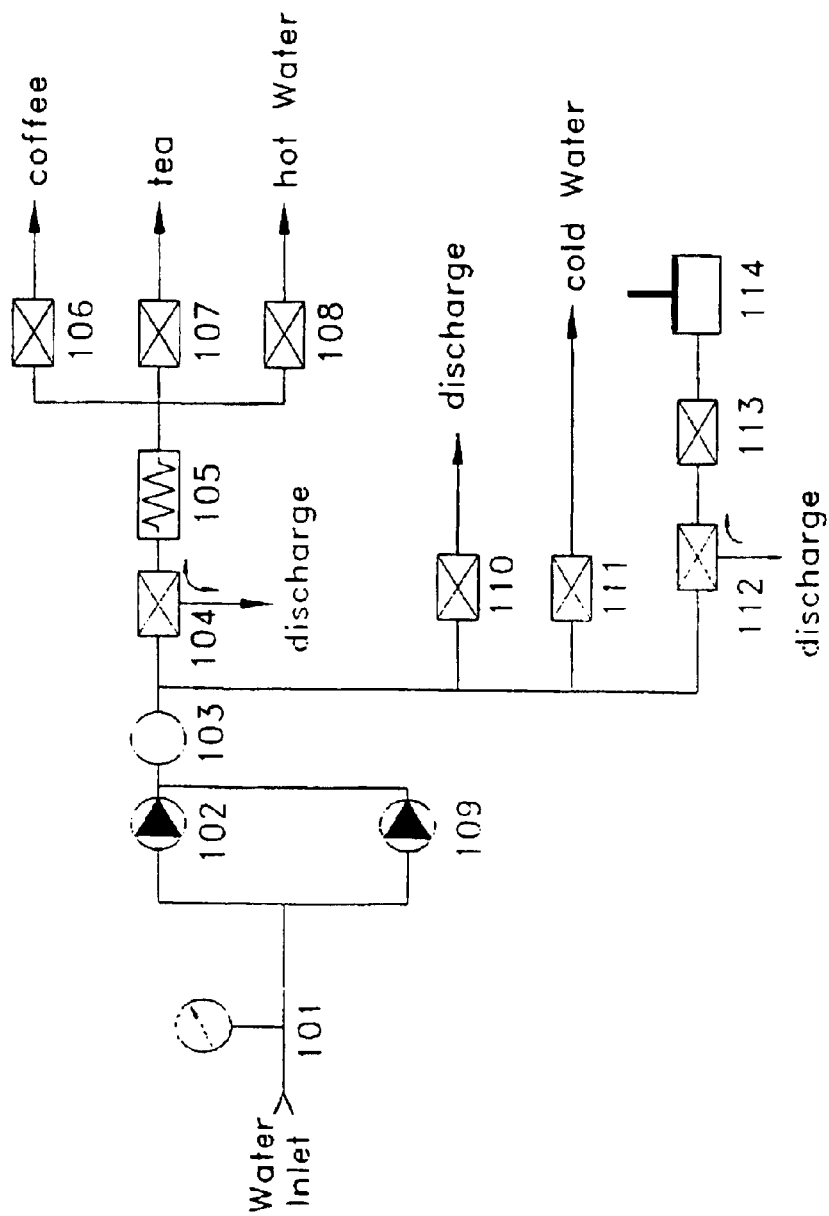
FIG. 10 is the hydraulic diagram.

FIG. 10 is a hydraulic diagram of the machine.

Herein below there is the list of the reference numbers inserted:
101. pressure safety switch
102. pump
103. flow meter
104. solenoid valve for inlet to exchanger
105. exchanger
106. solenoid valve for coffee output
107. solenoid valve for tea output
108. solenoid valve for hot water output
109. pump
110. safety valve
111. solenoid valve for cold water output
112. piston solenoid valve
113. separation solenoid valve
114. piston As may be noted, the pressure of the incoming water is detected by a pressure sensor 101 (set at the machine operating pressure), and the water then reaches the pumps 102 and 109 which send it on, via the flow meter 103, towards the elements controlling the four functions: "hot water" (solenoid valve 108), "coffee" (solenoid valve 106), "cold water" (solenoid valve 111), and "tea" (solenoid valve 107). Part of the water is also used to push the piston 114, together with the exchanger 22, against the cartridge-holder drawer 2.

The cold water passes through the pump 109 and the solenoid valve 111, which controls the "cold water" function. Included in FIG. 10 is the legend. The entire hydraulic circuit is protected against overpressures by means of the air valve 110, which opens for pressures higher than the maximum operating pressure.

The machine can advantageously be equipped with a second heater and with other elements, which may be easily identified by reading the description of the present invention, to produce also steam.

Under normal conditions, the machine is able to produce 1.5 litres of hot water at a temperature of approximately 85° C. in approximately 2 min 45 sec ±15 sec. There is nothing to prevent the machine according to the present invention from being used on other means of transport, such as trains (in particular high-speed trains), ships, etc.

What is illustrated in the attached figures is merely intended to provide an example of possible embodiments, and a person skilled in the art may make variations or modification without thereby departing from the spirit and scope of the invention. Any such variation or modifications are to be considered as included within the scope of the description and claims.

What is claimed is:

1. Machine, in particular for use on aircraft, that is able to dispense hot beverages, such as coffee, American-style coffee and tea in pre-set quantities, as well as to dispense hot and cold water, the said machine being provided with a hydraulic circuit and an electrical circuit and being governed by software, and having a basically parallelepipedal structure comprising: a structural paneling and a paneling forming a covering, an open front compartment in which a container or jug for beverages is housed, there being present above the said compartment a front control panel (1) and an underlying cartridge-holder drawer (2) which can be pulled out, the said machine being characterized in that is provided with a hydraulic circuit, regulated by means of electrovalves, operated by an electrical circuit governed by an electronic boards and central processing unit in which a control software is embedded being characterized in that it comprises at least one heater (22) inside which water is made to pass only at the moment of dispensing in the form of a beverage or of hot water, the said heater (22) being correspondingly and operatively connected to the cartridge-holder drawer (2), the operativeness being obtained by means of a hydraulic actuation system which vertically forces the heater (22) to come down onto the cartridge-holder drawer (2) so as to close it basically in a sealed manner when the beverage or hot water is being dispensed.

2. Machine according to claim 1, in which the structural paneling is U-shaped paneling (3, 3') substantially made of aluminum.

3. Machine according to claim 1, in which the covering paneling comprises a top panel (13) and perforated rear side panels (4).

4. Machine according to claim 2, in which the open compartment is basically delimited by the bottom wall of the cartridge-holder drawer (2), by the paneling (3, 3'), and by a plate (6) for supporting the jug.

5. Machine according to claim 2, in which present on the wall (3') are a spring-type sensor (8) which detects the presence of the jug when this is inserted and pressed against the said sensor (8), and a dispensing spout (9) for delivery of hot or cold water.

6. Machine according to claim 2, in which located on the wall (3'), at the bottom, is a handle (10) that can be raised or lowered so as to raise or lower correspondingly a pin which slides in guides (11) and which is designed to clamp the machine in position in the special housings provided on aircraft.

7. Machine according to claim 6, further equipped with channel-section guides (12) located on the underside of the machine, which are designed to slide on corresponding rails present in the housings provided on aircraft.

8. Machine according to claim 4, in which the plate (6) is slightly inclined towards the rear of the machine and has a drainage hole (6') connected to a discharge.

9. Machine according to claim 4, in which the plate (6) rests on a load-cell system that is able to detect the presence and weight of the jug and correspondingly control filling thereof.

10. Machine according to claim 1, further provided with a safety fixing device for the jug, basically consisting of a spring-operated shaped rod (15), the rod (15) having to be lowered manually for insertion of the jug, the latter, once it is housed on the plate (6), being held in position by the rod (15) which, being activated by the spring, comes back up.

11. Machine according to claim 10, in which the rod (15) coming back up holds the jug pressed against the presence sensor (8).

12. Machine according to claim 1, in which the covering paneling comprises a first, perforated, rear panel (16) and a second, structural, rear panel (17), the said latter panelling paneling carrying a connector for water (18), an electrical connector (20) and a manually resettable circuit breaker (19).

13. Machine according to claim 1, in which the front control panel (1) is of the touch-sensor type, with the controls of the various functions silk-screen printed on it, as follows: a) ON/OFF switch; b) "coffee" switch; c) "tea" switch; d) "hot water" switch; e) "cold water" switch; f) "blocked" indicator; g) "ready" indicator; h) "no water" indicator; i) "failure" indicator; and j) "released" indicator.

14. Machine according to claim 1, in which the drawer (2) opens and closes in a sliding way whereby, once the drawer (2) has been completely inserted into the machine, it may subsequently be pulled out for inserting or removing the cartridge during normal machine operation.

15. Machine according to claim 1, characterized in that it is made without any pressurized boiler for heating water.

16. Machine according to claim 1, wherein the heater (22) is able to supply steam or hot water or hot beverages.

17. Machine according to claim 1, having the following technical specifications: depth 310–390 mm; width 150–180 mm; height 290–340 mm; weight 11–16.7 kg; power supply 115 V, 400 Hz three-phase or 28 Vdc; power up to 3500 W; pressure of incoming water 0.3–5.0 bar.

18. Machine according to claim 17, in which the incoming-water pressure is 1.5–2.0 bar.

19. Machine according to claim 1, in which the printed-circuit boards required for machine operation are surface-treated with a protective treatment so as to withstand vibrations, be resistant to humidity, and be resistant to organic contaminants.

20. Machine according to claim 1, in which the electrical circuit is built so as not to create any electromagnetic interference with the instrumentation on board the aircraft and, at the same time, so as not to be affected by the said instrumentation, by means of a filtering system which is designed basically to eliminate the high-frequency components which generate electromagnetic waves.

21. Machine according to claim 18, further comprising a pressure sensor (101) which detects the pressure of the water entering the machine, and an air valve (110) calibrated so as to prevent overpressures.

22. Machine according to claim 21, further comprising a filter to prevent deposition of lime at the machine inlet.

23. Machine according to claim 1, further comprising at least one hydraulic distributor, the said distributor being basically a parallelepipedal element inside which channels are made for the passage of water, the said channels being arranged in such a way as to create the appropriate connection between a plurality of header-type solenoid valves.

24. Machine according to claim 23, in which the solenoid valves are of two types, two-way ones and three-way ones, the two-way solenoid valves controlling the flow of water by opening and closing, and the three-way solenoid valves presenting a further outlet to the discharge so that, when they are in the de-energized condition or are de-energized on account of overpressure, they open to the discharge.

25. Machine according to claim 1, further provided with a serial port of the type that may be connected to a personal computer.

26. Machine according to claim 1, used on other means of transport, such as trains, high-speed trains, ships and the like.

27. Machine according to claim 3, in which selection of the "coffee" function is according to the following operation steps:

6.1 press "coffee" switch
  6.2 is the "water in line" condition present?
  6.3 is the "low pressure in line" condition present?
  6.4 is the "no water" LED permanently on?
  6.5 is the "no water" LED flashing/stop
  6.6 is the "temperature ready" condition present?
  6.7 start-up of "10-sec timer"
  6.8 is the condition "server ok" present?
  6.9 is the condition "cartridge-holder in position" present?
  6.10 "coffee" LED flashing
  6.11 does the "10-sec timer" stop?/stop
  6.12 stop of "10-sec timer"
  6.13 start-up of "4-min timer"
  6.14 start-up of "2-sec timer"
  6.15 does the "2-sec timer" stop?
  6.16 is the condition "cartridge-holder in position" present?
  6.17 "failure" W LED lights up/stop
  6.18 does solenoid valve 113 deactivate?
  6.19 flow meter 103 starts count
  6.20 start-up of "10-sec timer"
  6.21 activates solenoid valves 104 and 106
  6.22 does the "10-sec timer" stop?
  6.23 stops pump and deactivates solenoid valves 104 and 106
  6.24 start-up of "10-sec time "
  6.25 does the "10-sec timer" stop?
  6.26 starts up pump and activates solenoid valves 104 and 106
  6.27 does the flow meter stop count?
  6.28 is the condition "server active" present?
  6.29 does the "4-min timer" stops?
  6.30 stops pump and counters and deactivates solenoid valves 106 and 112, increases by one the "coffee cycles" counter/stop and coffee is dispensed in a quantity of 1.5 liters ±10% at a temperature of approximately 85° C.+5° C. in approximately 2 min 45 sec±15 sec, the "coffee" function being operative only if the following conditions are satisfied: —a pressure sensor reads a line pressure of 0.3 bar–5.0 bar;—a temperature probe in the exchanger (22) reads a value of approximately 98° C. when the function is requested;—an optical sensor is ON, this meaning that the jug is present;—a first microswitch is ON, this meaning that the drawer (2) is completely inserted; and—a second microswitch is ON two seconds after the request for coffee, this meaning that a hydraulic piston is pressing against the exchanger (22) and the drawer (2) during dispensing; during delivery, if one of the aforesaid conditions is no longer satisfied, with the exception of the condition regarding the temperature probe, the function is immediately interrupted; end-of-delivery being controlled by a flow meter; a second safety system being present, which is controlled by the force sensor located underneath the plate (6) on which the jug rests and which interrupts delivery by checking the weight of the jug that is being filled; in addition, a 4-minute timer interrupting delivery if none of the above-mentioned devices is working; the "coffee" function being also interruptible when the "coffee" switch on the front control panel is pressed again.

28. Machine according to claim 13, in which selection of the "tea" function is according to the procedure described in the previous claim and according to the following operation steps:

7.1 press "tea" switch
  7.2 is the "water in line" condition present?
  7.3 is the "low pressure in line" condition present?
  7.4 is the "no water" LED permanently on?
  7.5 is the "no water" LED flashing?/stop
  7.6 is the "temperature ready" condition present?/stop
  7.7 start-up of "10-sec timer"
  7.8 is the condition "server ok" present?
  7.9 is the condition "cartridge-holder in position" present?
  7.10 "tea" LED flashing
  7.11 does the "10-sec timer" stop?/stop
  7.12 stop of "10-sec timer"
  7.13 start-up of "4-min timer"
  7.14 flow meter 103 starts count
  7.15 starts up pump and activates solenoid valves 104 and 107
  7.16 does flow meter finish count?
  7.17 is the "server active" condition present?
  7.18 does the "4-min" count stop?
  7.19 stops pumps and counters and deactivates solenoid valves 104 and 107, increases by one the "tea cycles" COUNTER/STOP.

29. Machine according to claim 13, in which selection of the "hot water" function is according to the following operation steps:

8.1 press "hot water" switch
  8.2 is the "water in line" condition present?
  8.3 is the "low pressure in line" condition present?
  8.4 is the "no water" LED permanently on?
  8.5 "no water" LED flashing/stop
  8.6 is the "temperature ready" condition present?/stop 8.7 start-up of "20-sec timer"

8.8 starts up pumps and activates solenoid valves 104 and 108

8.9 20-sec" timer stops 8.10 stops pumps and deactivates solenoid valves 104 and 108 increases by one the "hot water cycles" counter/stop and hot water is dispensed in a quantity of approximately 0.25 liters at a temperature of approximately 85° C.±5° C. in approximately 30 sec., the "hot water" function being operative only if the following conditions are satisfied: a pressure sensor reads a line pressure of 0.3 bar–5.0 bar;—a temperature probe in the exchanger (22) reads a value of approximately 98° C. when the function is requested; during delivery, if the first condition is no longer satisfied, the function is immediately interrupted; delivery being interrupted after 30 sec, or else by pressing the "hot water" switch on the front control panel again.

30. Machine according to claim 13, in which selection of the "cold water" function is according to the following operation steps:

9.1 press "cold water" switch 9.2 is the "water in line" condition present?

9.3 is the "low pressure in line" condition present?

9.4 is the "no water" LED permanently on?

9.5 "no water" LED flashing/stop 9.6 start-up of "20-sec timer"

9.7 starts up pump and activates solenoid valve 111

9.8 "20-sec timer" stops 9.9 stops pump and deactivates solenoid valve 111- increases by one the "cold water cycles" counter/stop and cold water is dispensed in a quantity of approximately 0.25 liters at room temperature, the "cold water" function being operative only if the pressure sensor reads a line pressure of 0.3 bar–5.0 bar, delivery being interrupted after 30 sec, or else by pressing the "cold water" switch on the front control panel again.

31. Machine according to claim 21, in which the pressure of the incoming water is controlled by a pressure sensor (1001) set at the machine operating pressure, and the water then reaches the pumps (102) and (109), which send it on, via the flow meter (103), towards the elements controlling the following functions: "hot water", via the solenoid valve (108), "coffee", via the solenoid valve (106), "cold water", via the solenoid valve (111), and "tea", via the solenoid valve (107), part of the water bring also used to push the piston (114) together with the exchanger (22) against the cartridge-holder drawer (2), the cold water moreover passing through the pump (109) and the solenoid valve (111), which controls the "cold water" function.

32. Heater (22) made of machined anodized aluminum, having basically a plane conformation and comprising of four elements: a central element (24), inside which at least one resistor is embedded, the top and bottom surfaces of the element (24) being furrowed by grooves or coils (24e) and (24f) having a semicircular cross section and being in communication through a hole (24c), and being moreover sized, in terms of length and section, according to the amount of water that is to be heated, the central element (24) being moreover closed in a sealed manner between a further two plane elements, an overlying element (25) and an underlying element (26), the element (25) being in turn provided, on its top face, with recesses or hollows made for lightening the structure (25a), the underlying element (26) being in turn provided, on its bottom face, with a recess (26a), whilst its top face is basically plane.

33. Heater according to the previous claim, in which the water inlet and water outlet are, respectively, (25b) and (25c), the said heater (22) being correspondingly and operatively connected to a cartridge-holder drawer (2), the operation being obtained by means of a hydraulic actuation system which vertically forces the heater (22) to come down onto the cartridge-holder drawer (2) so as to close it basically in a sealed manner when the hot water or beverage is being dispensed.

34. Heater according to claim 33, in which the operating connection is such that the heater (22) moves along travel guides (23), assisted by the presence of springs, the said movement being produced by a hydraulic piston, the said piston being pressurized by a pump.

35. Heater according to claim 32, in which the bottom face of the element (26), provided with the recess (26a), is connected in a sealed manner to a perforated plate (27), which faces and/or is in contact with the cartridge housed inside the drawer (2).

36. Heater according to claim 35, in which the recess (26a) has a thickness of approximately 0.8 mm.

37. Heater according to claim 32, in which the element (25) is further provided with a hole (25b) for intake of water into the exchanger (22), with a corresponding water-outlet hole (25c), and with a further hole (25d) for passage of water to the drawer (2), the said latter hole (25d) corresponding to a further two holes, (24d) and (26d), which are also directed towards the drawer (2) and are set, respectively, on the element (24) and on the element (26).

38. Cartridge-holder drawer and heater assembly in which the heater is according to claim 32, in the said assembly the water passing as follows: the water comes into the hole (25b), passes into the coil (24e), drops into the hole (24c), runs along the coil (24f), returns upwards through the hole (24c), and comes out of the exchanger through the hole (25c); it then goes to a solenoid valve (106), returns to the hole (25d), passes through the holes (24d) and (26d), and then arrives at the chamber (26a), from where it is distributed, comes out from the holes in the plate (27), and drops through the cartridge in the drawer (2), from which it comes out through an outlet hole.

39. Assembly according to claim 38, to be used in coffee machines.

* * * * *